Patented July 23, 1929.

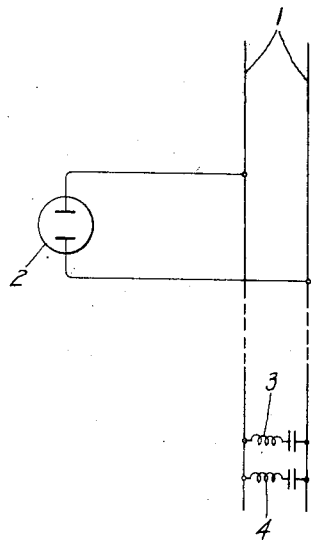
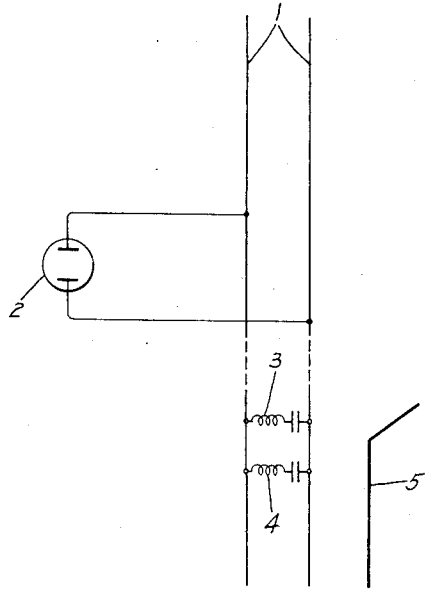
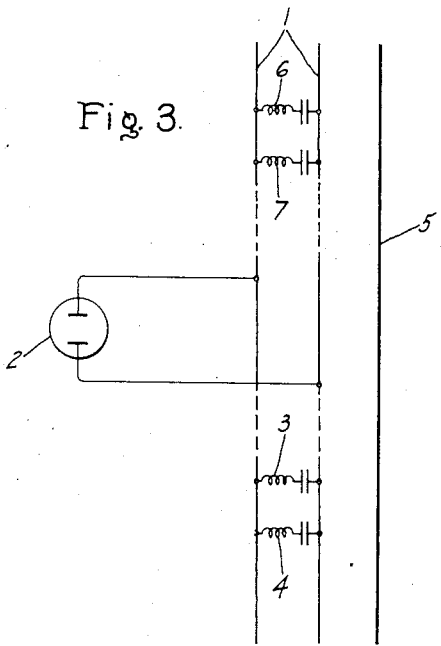

1,722,207

UNITED STATES PATENT OFFICE.

HERMANN GEISE, OF BERLIN-OBERSCHONEWEIDE, GERMANY, ASSIGNOR TO GENERAL ELECTRIC COMPANY, A CORPORATION OF NEW YORK.

MEANS FOR SUPPRESSING HIGHER HARMONICS.

Application filed July 31, 1928, Serial No. 296,591, and in Germany August 20, 1927.

My invention relates to means for suppressing higher harmonics in electrical power circuits located adjacent communication systems and interconnected with a mercury rectifier or the like, and has for its principal object the provision of an improved apparatus and method of operation whereby such interference is readily avoided.

It is well known that the anode current wave of a mercury rectifier tends to assume a rectangular form as a result of which higher harmonic currents are likely to be produced in the power supply circuits. These higher harmonic currents are objectionable for the reason that they interfere with the operation of communication systems adjacent the power circuits. It has been proposed in the past to avoid this difficulty by means of tuned circuits connected in shunt to the rectifier and a reactor connected in one of the power leads between the rectifier and the tuned circuits for limiting the harmonic currents. This arrangement however has the disadvantage that the reactor, which also transmits the power current, is very expensive and involves considerable losses of power. In accordance with my invention this disadvantage is avoided by utilizing the natural inductance of the power line for the purpose of limiting the harmonic currents.

My invention will be better understood from the following description when considered in connection with the accompanying drawing and its scope will be pointed out in the appended claims.

Referring to the drawings, Figs. 1, 2 and 3 illustrate power supply systems wherein my invention has been embodied.

This system includes a circuit 1 to which direct current power is supplied from a suitable source through a rectifier 2 diagrammatically shown as provided with electrodes connected to the postive and negative terminals of the direct current circuit 1. The higher harmonic currents produced by operation of the rectifier 1 are restricted to the immediate vicinity of the rectifier by means of tuned circuits or resonants shunts 3 and 4. The particular point at which these resonant shunts are connected across the circuit 1 is dependent on the natural inductance of the circuit 1. In each case the location of these shunts should be such that the inductance of the part of the circuit 1 between them and the rectifier is large enough to maintain the higher harmonic currents within the desired limits. In the usual installation this distance may be of the order of 100 meters.

As indicated by Fig. 2 it is sufficient to connect the resonant shunts 3 and 4 at one point if the communication system 5 is not located in the immediate vicinity of the rectifier station. If the communication system 5 is coextensive with the power circuit as illustrated by Fig. 3, however, a second group of resonant shunts 6 and 7 must be connected across the circuit 1 on the opposite side of the rectifier station at a distance from the station which is the same as that intervening between the station and the shunts 3 and 4. With these connections, the higher harmonic currents are short-circuited by the circuits including the resonant shunts and their effects are cancelled so that interference with the operation of the communication system is avoided.

What I claim as new and desire to secure by Letters Patent of the United States is:

1. The combination of an electrical power supply circuit, an alternating current rectifier connected to said circuit at one location, and resonant shunts connected to said circuit at another location, the spacing between said locations being such that the currents of said shunts are restricted by the natural impedance of said circuit to a value insufficient to cause interference with neighboring communication circuits.

2. The combination of an electrical power supply circuit, an alternating current rectifier connected to said circuit at one location, resonant shunts connected to said circuit at locations on opposite sides of said rectifier, the spacing between said shunts and said rectifier being such that the currents of said shunts are limited by the natural impedance of said circuit to a value insufficient to cause interference with neighboring communication circuits.

3. The combination of an electrical power supply circuit, an alternating current rectifier connected to said circuit at one location, and resonant shunts connected to said circuit on opposite sides of said rectifier and equally spaced therefrom.

In witness whereof, I have hereunto set my hand this 13th day of July 1928.

HERMANN GEISE.